(12) United States Patent
Yamada

(10) Patent No.: US 10,046,543 B2
(45) Date of Patent: Aug. 14, 2018

(54) LAMINATED FILM AND FILM ATTACHMENT METHOD

(71) Applicant: Sharp Kabushiki Kaisha, Osaka-shi, Osaka (JP)

(72) Inventor: Nobuaki Yamada, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 345 days.

(21) Appl. No.: 14/777,545

(22) PCT Filed: Feb. 18, 2015

(86) PCT No.: PCT/JP2015/054404
§ 371 (c)(1),
(2) Date: Sep. 16, 2015

(87) PCT Pub. No.: WO2015/125813
PCT Pub. Date: Aug. 27, 2015

(65) Prior Publication Data
US 2016/0347032 A1    Dec. 1, 2016

(30) Foreign Application Priority Data

Feb. 18, 2014 (JP) ................................. 2014-028776

(51) Int. Cl.
*B32B 7/12* (2006.01)
*B32B 38/10* (2006.01)

(52) U.S. Cl.
CPC ............... *B32B 7/12* (2013.01); *B32B 38/10* (2013.01); *B32B 2307/40* (2013.01); *B32B 2307/402* (2013.01); *B32B 2457/20* (2013.01)

(58) Field of Classification Search
CPC ......... B32B 7/08; B32B 37/12; B32B 405/00; B32B 2457/208; B32B 7/12; B32B 38/10;
(Continued)

(56) References Cited

U.S. PATENT DOCUMENTS

| | | | |
|---|---|---|---|
| 2002/0104676 | A1 | 8/2002 | Treutlein et al. |
| 2009/0186181 | A1* | 7/2009 | Mase ............... B29C 63/02 428/40.1 |

(Continued)

FOREIGN PATENT DOCUMENTS

| | | |
|---|---|---|
| CN | 201538078 U | 8/2010 |
| CN | 203110429 U | 8/2013 |

(Continued)

OTHER PUBLICATIONS

International Search Report PCT/ISA/210 for International Application No. PCT/JP2015/054404 dated May 19, 2015.

*Primary Examiner* — Patricia L. Nordmeyer
(74) *Attorney, Agent, or Firm* — Harness, Dickey & Pierce, P.L.C.

(57) ABSTRACT

The present invention provides a laminated film that can be easily used by general users and can prevent entry of foreign substances and air bubbles between the attached surfaces even when the film is manually attached in a typical room environment in which foreign substances such as dust are floating; and a film attachment method using such a laminated film. The laminated film includes in the following order: a surface protective film; a foreign-substance-removing adhesive layer; a foreign-substance-removing film; a substrate-attaching adhesive layer; and a functional film, the substrate-attaching adhesive layer exhibiting a higher bond strength with the functional film than with the foreign-substance-removing film.

13 Claims, 8 Drawing Sheets

(58) Field of Classification Search
CPC .......... B32B 2307/402; B32B 2307/40; B32B 2457/20
See application file for complete search history.

(56) References Cited

U.S. PATENT DOCUMENTS

2012/0087072 A1* 4/2012 McGuire ............. B29C 63/0047
361/679.01
2013/0344275 A1 12/2013 Shin et al.

FOREIGN PATENT DOCUMENTS

| | | |
|---|---|---|
| EP | 1160075 A2 | 12/2001 |
| EP | 2677513 A2 | 12/2013 |
| JP | H7-318919 A | 12/1995 |
| JP | H8-50290 A | 2/1996 |
| JP | H8-274058 A | 10/1996 |
| JP | 2003-534954 A | 11/2003 |
| JP | 2005-125526 A | 5/2005 |
| JP | 2006-119186 A | 5/2006 |
| JP | 2006-186026 A | 7/2006 |
| JP | 2007-172241 A | 7/2007 |
| JP | 2010-286664 A | 12/2010 |
| JP | 2012-218353 A | 11/2012 |
| JP | 2014-004834 A | 1/2014 |
| KR | 2014-0000358 A | 1/2014 |
| WO | WO-2001/093280 A1 | 5/2001 |

* cited by examiner (a)

(b)

(c)

(d)

(a)

(b)

(c)

(d)

LAMINATED FILM AND FILM ATTACHMENT METHOD

TECHNICAL FIELD

The present invention relates to a laminated film and a film attachment method. More specifically, the present invention relates to a laminated film suitably attachable to the surface of a mobile display device such as cellphones and tablet PCs, and a film attachment method allowing users at home or mass retailers, for example, to suitably attach such a laminated film to a product.

BACKGROUND ART

Mobile display devices such as cellphones and tablet PCs are apt to be damaged when hit or scratched, for example, and thus the users often manually attach a protective film to the surface of their mobile display device on their own. When the users attach a film to a product on their own, they usually attach a film in a typical room environment which is not a controlled environment such as a clean room environment or vacuum. In a typical room environment, however, it is difficult to manually attach a film while sufficiently preventing entry of foreign substances and air bubbles between the product and the film.

One film attachment method that can be manually performed and can prevent entry of foreign substances and air bubbles even in a typical room environment is a method that controls the attachment position of the film and removes air bubbles using soapy water, and then dries the film in the air. This method is used by a professional of film attachment when he or she attaches to a glass window a film on which a company logo or an advertisement is printed. This method has advantages such as a fine control of the attachment position. However, this method is inconvenient for general users because soapy water is required and air-drying takes time, for example. Also, the method can still be improved in terms of preventing entry of foreign substances, though the method can sufficiently remove air bubbles.

Meanwhile, mainly for the case of attaching a film to a product in a factory, there are various known treatment methods and devices for preventing entry of foreign substances and air bubbles between attached surfaces. The common methods here include, for example, a method of performing attachment in a clean room or in vacuum (e.g. Patent Literature 1). For example, for attachment to a liquid crystal panel, a large-scale cleaning system is used.

Patent Literature 2 discloses a method including supplying a liquid whose temperature is higher than the room temperature to eliminate foreign substances and dirt on the surface of the liquid crystal panel. Patent Literature 3 discloses an attachment apparatus configured to automatically clean the surface of the liquid crystal panel body with its foreign-substance-cleaning roller before attachment of a polarizer to the surface.

Other known methods are to remove foreign substances by making the foreign substances stick to an adhesive layer. Patent Literature 4 discloses a foreign-substance-removing adhesive tape whose adhesive layer surface picks up foreign substances on the surface of a product such as a semiconductor wafer and a glass substrate to remove the foreign substances. Patent Literature 5 discloses a foreign-substance-removing sheet designed to be attached to a conveyer member when used, wherein the separator for protection of the surface of the foreign-substance-removing layer is attached to the foreign-substance-removing layer by an adhesive layer.

Also, although it is not designed to prevent foreign substances present in the surrounding air at the time of film attachment from entering between the attached surfaces, Patent Literature 6 discloses a screen protective sheet capable of removing foreign substances stuck to the layer for attachment in the production process by utilizing a removal layer that is obtained by applying and solidifying a liquid resin agent and is to be removed before attachment. This screen protective sheet does not have a function of removing foreign substances on the screen which is considered to be the attachment target.

Similarly, although it is not designed to prevent foreign substances present in the surrounding air at the time of film attachment from entering between the attached surfaces either, Patent Literature 7 discloses a laminated body having a similar structure to the foreign-substance-removing adhesive tape or sheet described in Patent Literature 4 or 5. That is, Patent Literature 7 discloses a long body including a pattern-structure layer, wherein the long object is attached to one surface of a pattern-layer film by an adhesive layer, and a removal film is attached to the other surface of the pattern-layer film by an adhesive layer.

CITATION LIST

Patent Literature

Patent Literature 1: JP H07-318919 A
Patent Literature 2: JP 2010-286664 A
Patent Literature 3: JP H08-50290 A
Patent Literature 4: JP H08-274058 A
Patent Literature 5: JP 2006-186026 A
Patent Literature 6: JP 2006-119186 A
Patent Literature 7: JP 2012-218353 A

SUMMARY OF INVENTION

Technical Problem

As described above, the conventional film attachment methods capable of preventing entry of foreign substances and air bubbles have not been easy to use for general users and have not achieved sufficient effects. For example, in the method that attaches a film using soapy water, the surface to which a film is to be attached and the adhesive surface of the film are both exposed to the typical room environment before the film is attached. This state unfortunately lets foreign substances stick to the surfaces. Hence, the method that attaches a film using soapy water can be improved such that entry of foreign substances is more sufficiently prevented.

Also, the technique of Patent Literature 1 utilizes a vacuum chamber. The technique of Patent Literature 2 utilizes a liquid whose temperature is higher than room temperature. The technique of Patent Literature 3 is designed to be used when the process is automatically performed by an attachment apparatus. Patent Literature documents 4 and 5 each merely disclose removal of foreign substances by a foreign-substance-removing adhesive tape or sheet, and do not disclose how to attach a film to a product while preventing entry of foreign substances and air bubbles after removal of the foreign-substance-removing adhesive tape or sheet. Neither of the techniques of Patent Literatures 6 and 7 is designed to prevent entry of foreign substances present in the surrounding air at the time of film attachment.

Hereinafter, before the principle of the present invention is described, description is given for the reason that foreign substances and air bubbles enter between a product and a film when a conventional laminated film not having a function of removing foreign substances is attached to a product in a typical room environment, with reference to FIG. 17.

FIG. 17 is a cross-sectional view illustrating an attachment method for a conventional laminated film. In the following, the procedure of attaching a conventional laminated film is described based on FIG. 17. The procedure (a) in FIG. 17 illustrates the state of a substrate 100 before a laminated film is attached. In a typical room environment which is not a controlled environment such as a clean room environment or vacuum, many fine foreign substances 200 such as dust are floating. Hence, the foreign substances 200 are stuck to the surface of the substrate 100. Even when the surface of the substrate 100 is cleaned before attachment of a laminated film, it is difficult to prevent the foreign substances 200 from sticking again to the surface of the substrate 100 in a typical room environment if the attachment is not performed immediately after completion of the cleaning. The above-described Patent Literature showing the method for removing foreign substances by a foreign-substance-removing adhesive tape or sheet does not disclose any measure to take for such a problem.

The procedure (b) in FIG. 17 illustrates the positional alignment of a conventional laminated film before attachment. The conventional laminated film illustrated in the procedure (b) in FIG. 17 has a structure including a separator film 211 arranged on the lower surface of an optical film 217 with an adhesive layer 216 in between.

As illustrated in the procedure (c) in FIG. 17, the separator film 211 is peeled off to expose the adhesive layer 216. Since the surface of the adhesive layer 216 exhibits adhesion, the foreign substances 200 floating in the room environment are likely to stick to the surface.

As illustrated in the procedure (d) in FIG. 17, the adhesive layer 216 is brought into close contact with the substrate 100 by an attachment roller 241, so that the optical film 217 is attached to the substrate 100. If the foreign substances 200 are stuck to the surface of the substrate 100 or the adhesive layer 216, the attachment causes the foreign substances 200 to be included between the substrate 100 and the optical film 217. Also, air bubbles can be included between the substrate 100 and the optical film 217. In the case where the substrate 100 is a screen of the display device, the portions including air bubbles may appear as white spots and the portions including foreign substances may function as lenses, so that the display device may fail to provide appropriate display. Accordingly, a laminated film attachment method which can prevent entry of foreign substances and air bubbles even in a typical room environment has been desired.

The present invention has been made in view of the above current state of the art, and aims to provide a laminated film that can be easily used by general users and can prevent entry of foreign substances and air bubbles between the attached surfaces even when the film is manually attached in a typical room environment in which foreign substances such as dust are floating; and a film attachment method using such a laminated film.

Solution to Problem

The present inventor has made various studies on functional films and film attachment methods that do not require any special environmental control or special equipment for attachment, and that can prevent entry of foreign substances and air bubbles even when attachment is manually performed in a typical room environment. As a result, the inventor has focused on the typical room environment in which many foreign substances such as dust are floating in the air and, even when foreign substances on the substrate, which is the target of functional film attachment, are once removed, foreign substances stick again to the substrate and the adhesive surface of the functional film until immediately before attachment of the functional film. The present inventor has then found that a laminated film including a foreign-substance-removing film capable of cleaning up the surface of the substrate can remove foreign substances on the substrate immediately before the functional film is attached, and then immediately attach the functional film. Also, the inventor has found that when the attachment method is devised, foreign substances can be effectively prevented from sticking to the adhesive surface of a functional film. Thereby, the present inventor has solved the problems, completing the present invention.

That is, one aspect of the present invention may be a laminated film including in the following order: a surface protective film; a foreign-substance-removing adhesive layer; a foreign-substance-removing film; a substrate-attaching adhesive layer; and a functional film, the substrate-attaching adhesive layer exhibiting a higher bond strength with the functional film than with the foreign-substance-removing film.

Another aspect of the present invention may be a laminated film including in the following order: a surface protective film; a foreign-substance-removing adhesive layer; a foreign-substance-removing film; a substrate-attaching adhesive layer; and a functional film, the substrate-attaching adhesive layer has higher adhesive power than the foreign-substance-removing adhesive layer.

Yet another aspect of the present invention may be a film attachment method for attaching to a substrate a functional film included in the laminated film of the present invention, including the steps of:

(1) peeling off the surface protective film from the laminated film to expose the foreign-substance-removing adhesive layer;

(2) bringing the exposed foreign-substance-removing adhesive layer into close contact with the surface of the substrate to attach the laminated film to the substrate;

(3) connecting, by a connection component, a vicinity of the region of the substrate with the laminated film attached thereto and an end of the functional film that is on the top of the laminated film;

(4) peeling off the substrate-attaching adhesive layer from the foreign-substance-removing film in the state where the substrate and the functional film are kept in contact with each other by the connection component; and (5) while peeling off the foreign-substance-removing adhesive layer from the surface of the substrate to expose the surface of the substrate, bringing the substrate-attaching adhesive layer into close contact with the exposed surface of the substrate to attach the functional film to the substrate.

Advantageous Effects of Invention

The laminated film of the present invention can, even when foreign substances such as dust are present on the substrate, remove the foreign substances on the substrate immediately before attachment of a functional film, and then immediately attach the functional film. Accordingly, the laminated film can sufficiently prevent entry of foreign substances and air bubbles in an interface between the attached surfaces. Also, since the laminated film requires no special environmental control or equipment for attachment and requires no liquid, the laminated film can be easily used by general users.

Also, the film attachment method of the present invention utilizing the laminated film of the present invention enables a functional film to be attached to a substrate without entry of foreign substances and air bubbles in an interface between the attached surfaces even in a typical room environment. Furthermore, differently from the conventional attachment method using soapy water, the film attachment method of the present invention is a dry attachment method which requires no liquid. Hence, the film attachment method can greatly shorten the work time, and allows work without contamination of the work environment.

DESCRIPTION OF EMBODIMENTS

Definition of Terms

Each "film" herein is not limited by its thickness, and may be what is called a "sheet".

The adhesive power of an adhesive layer is different for different attachment targets and in the measurement methods. Herein, in the case of evaluating the adhesive power of an adhesive layer, a substrate made of alkali-free glass is used as the attachment target regardless of the actual attachment target, and an adhesive power value determined by the following measurement method is used. However, in the case of evaluating the adhesive power of an adhesive layer for a surface on which an easy-peel treatment has been performed, a substrate made of alkali-free glass on which the same easy-peel treatment has been performed is used. Here, the absolute value of the adhesive power is different for different attachment targets, but the relation of the adhesive power strengths tends not to change.

(Method for Measuring Adhesive Power)

To a substrate horizontally fixed, a strip-like film including an adhesive layer with a width of 25 mm is attached. At this time, one end of the film should not be attached to the substrate. The one end of the film not attached to the substrate is held between clamps of a tensile tester (peel test jig), so that a 90° peel test (rate of pulling: 0.3 m/min) is performed.

Hereinafter, embodiments and examples of the present invention are described with reference to drawings. The present invention, however, is not limited to the following embodiments and examples. Also, the structures in the embodiments and examples may be appropriately combined or changed if the combination or change does not go beyond the spirit of the present invention. In the embodiments, components exerting the same function are provided with the same reference signs.

Embodiment 1

(1) Structure of Laminated Film

Figure 1:
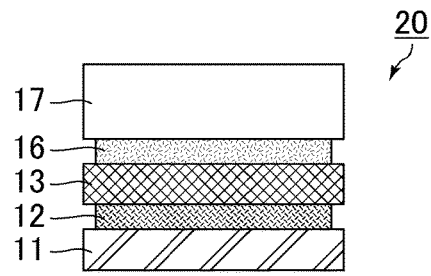
FIG. 1 is a schematic cross-sectional view illustrating a laminated film according to Embodiment 1.

FIG. 1 is a schematic cross-sectional view illustrating a laminated film according to Embodiment 1. A laminated film 20 according to Embodiment 1 has a structure including components in the order of a separator film (surface protective film) 11, a foreign-substance-removing adhesive layer 12, a foreign-substance-removing film 13, a substrate-attaching adhesive layer 16, and an optical film (functional film) 17. When the laminated film 20 is attached to a substrate, the optical film 17 comes to the top of the laminated film 20. On the surface of the optical film 17 on which the substrate-attaching adhesive layer 16 is not provided, an adhesive layer and a surface protective film may be laminated.

The separator film 11 is designed to protect the surface of the foreign-substance-removing adhesive layer 12 before use. The separator film 11 is not particularly limited, and may be, for example, a general film such as a polyethylene terephthalate (PET) film, a polyethylene naphthalate (PEN) film, an acrylic film, or a cycloolefin polymer (COP) film.

The foreign-substance-removing adhesive layer 12 is designed to pick up foreign substances present on the surface of the substrate being the attachment target, and preferably has significantly lower adhesive power than the substrate-attaching adhesive layer 16. Materials suitable for the foreign-substance-removing adhesive layer 12 are adhesive materials classified to have weak adhesive power. Examples thereof include PF-AN422, PF-AN474 (both from Lintec Corporation), and ZBO-0421 (from Fujimori Kogyo Co., Ltd.). The adhesive power of the foreign-substance-removing adhesive layer 12 is preferably 0.05 to 1 N/25 mm width. An adhesive power value of lower than 0.05 N/25 mm width is likely to cause the adherend to peel off, which results in poor workability. An adhesive power value of higher than 1 N/25 mm width may be higher than the adhesive power of the substrate-attaching adhesive layer 16, and may not allow easy peeling of the first separator film 11.

The foreign-substance-removing film 13 is designed to support the foreign-substance-removing adhesive layer 12. The foreign-substance-removing adhesive layer 12 and the foreign-substance-removing film 13 are collectively handled, and attachment and peeling of the foreign-substance-removing film 13 mean attachment and peeling of the foreign-substance-removing adhesive layer 12 at the same time. The foreign-substance-removing film 13 is not particularly limited, and may be, for example, a general film such as a polyethylene terephthalate (PET) film, a polyethylene naphthalate (PEN) film, an acrylic film, or a cycloolefin polymer (COP) film. The foreign-substance-removing film 13 may be colored. If colored, the foreign-substance-removing film 13 can be easily identified, and is therefore less likely to be confused with other films to be peeled off in the attachment process. Also, since the foreign-substance-removing film 13 is to be eventually removed from the substrate, there is no disadvantage of coloring.

The substrate-attaching adhesive layer 16 is used to attach the optical film 17 to a substrate, and also functions to combine the foreign-substance-removing film 13 and the optical film 17 in the laminated film 20. The substrate-attaching adhesive layer 16 and the optical film 17 are collectively handled, and attachment and peeling of the optical film 17 mean attachment and peeling of the substrate-attaching adhesive layer 16 at the same time. Materials suitable for the substrate-attaching adhesive layer 16 are those that firmly stick to a substrate. Specific examples thereof include MO3014 (from Fujimori Kogyo Co., Ltd.), MCF-464, and NCF-619 (both from Lintec Corporation). The adhesive power of the substrate-attaching adhesive layer 16 is higher than the adhesive power of the foreign-substance-removing adhesive layer, and is specifically preferred to be 1 to 30 N/25 mm width. An adhesive power value of lower than 1 N/25 mm width may be lower than the adhesive power of the foreign-substance-removing adhesive layer 12 which is a lower layer, resulting in poor workability in a process such as peeling of the first separator film 11. An adhesive power value of higher than 30 N/25 mm width is likely to cause the adherend not to be easily peeled off, resulting in poor workability.

Also, an easy-peel treatment is performed on the surface of the foreign-substance-removing film 13 on the substrate-attaching adhesive layer 16 side, and thus the substrate-attaching adhesive layer 16 has a higher bond strength with the optical film 17 than with the foreign-substance-removing film 13.

Nonlimiting examples of the optical film 17 include films having an optical function, such as anti-reflective films, anti-glare films, and retardation films. The structure of the optical film 17 is not particularly limited, and the optical film 17 may have irregularities on the surface or may have a laminated structure. Examples of the structures (projections) constituting the irregularities include conical nanostructures. Specific examples of the optical film 17 having irregularities on the surface include moth-eye films having a moth-eye surface structure. Specific examples of the optical film 17 having a laminated structure include DBEF series from Sumitomo 3M Limited. Examples of the material of the optical film 17 include polyethylene terephthalate (PET), polyethylene naphthalate (PEN), acrylic compounds, cycloolefin polymer (COP).

The laminated film according to Embodiment 1 described above can, by the attachment method shown in FIG. 2, prevent entry of foreign substances and air bubbles in an interface between the attached surfaces when the optical film 17 is attached to a substrate in the atmosphere in which foreign substances such as dust are floating and are on the substrate.

(2) Method for Attaching Laminated Film

Figure 2:
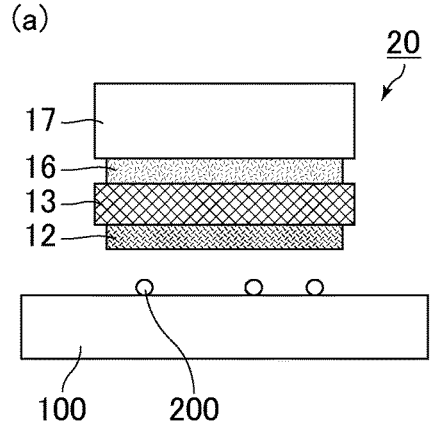
FIG. 2 is a schematic cross-sectional view for describing a method for attaching the laminated film according to Embodiment 1 to a substrate.
Figure 2:
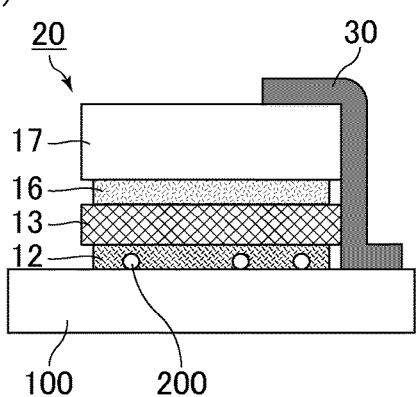
Figure 2:
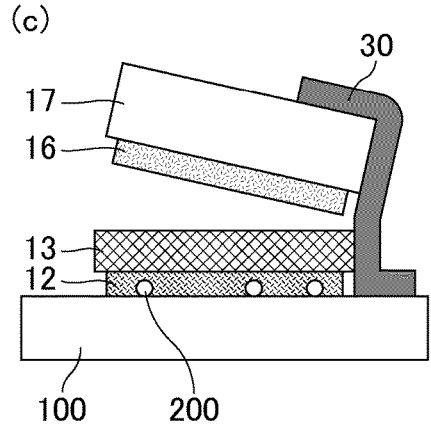
Figure 2:
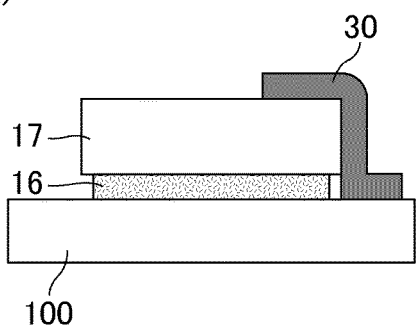

FIG. 2 is a schematic cross-sectional view for describing the method for attaching the laminated film according to Embodiment 1 to a substrate. Hereinafter, the attachment procedure of the laminated film according to Embodiment 1 is described based on FIG. 2.

(Procedure 1) Alignment

The laminated film 20 and a substrate 100 are aligned. At this time, the laminated film 20 may be fixed on the substrate 100 by attaching one end side of the laminated film 20 to the substrate 100 by a connection component such as tape 30. In the case where a relatively large foreign substance or dirt is present on the substrate 100, the surface of the substrate 100 may be cleaned before the laminated film 20 is attached to the surface of the substrate 100. In environments other than the environments in which foreign substances are artificially removed such as a clean room environment or vacuum, foreign substances 200 such as dust are usually floating in the air, and thus the foreign substances 200 are stuck to the surface of the substrate 100 which is the attachment target as illustrated in the procedure (a) in FIG. 2. The substrate 100 may be of any type, and may be a glass plate or a resin film, for example.

(Procedure 2) Attachment of Laminated Film 20

The separator film 11 is peeled off to expose the foreign-substance-removing adhesive layer 12. In this state, as illustrated in the procedure (b) in FIG. 2, the laminated film 20 is attached to the substrate 100. Thereby, the foreign-substance-removing adhesive layer 12 and the surface of the substrate 100 are brought into close contact with each other, so that the foreign substances 200 stuck to the surface of the substrate 100 are caught by the foreign-substance-removing adhesive layer 12. In the case where the fixation using the tape 30 has not been performed in the above (Procedure 1) Alignment, one end side of the laminated film 20 is attached by the tape 30 to the vicinity of the region of the substrate 100 with the laminated film 20 attached thereto, whereby the laminated film 20 is fixed on the substrate 100. The tape 30 is attached to an end of the optical film 17 that is on the top of the laminated film 20. Also, preferably, while the separator film 11 is peeled off, the exposed foreign-substance-removing adhesive layer 12 is consecutively pressed onto the substrate 100 with a roller. Thereby, it is possible to prevent entry of air bubbles between the surface of the substrate 100 and the foreign-substance-removing adhesive layer 12, enabling suitable removal of the foreign substances 200 from the entire surface of the substrate 100.

(Procedure 3) Separation of Foreign-Substance-Removing Film 13 and Optical Film 17

When the optical film 17 is lifted while the foreign-substance-removing film 13 is pressed down, the foreign-substance-removing film 13 and the optical film 17 are separated as illustrated in the procedure (c) in FIG. 2. As a result, the laminated film 20 is open in a V shape. At this time, the substrate-attaching adhesive layer 16 is on the optical film 17 side.

(Procedure 4) Removal of Foreign-Substance-Removing Film 13 and Attachment of Optical Film 17

An end of the foreign-substance-removing film 13 is peeled off from the tape 30. As the end of the foreignsubstance-removing film 13 on the tape 30 side is pulled out of the region between the substrate 100 and the optical film 17, the optical film 17 is consecutively pressed onto the substrate 100 by an attachment roller. Thereby, the substrate 100 and the substrate-attaching adhesive layer 16 come into close contact with each other, so that the optical film 17 is attached to the surface of the substrate 100 with the substrate-attaching adhesive layer 16 in between as illustrated in the procedure (d) in FIG. 2. When the foreign-substance-removing film 13 is pulled out, a pick-up stick may be used. In this case, the foreign-substance-removing film 13 can be peeled off by inserting a pick-up stick in the region between the substrate 100 and the optical film 17, connecting the pick-up stick to the foreign-substance-removing film 13, and pulling out the pick-up stick. Examples of the pick-up stick include those having a connecting member such as an adhesive member (e.g. double-sided tape) or a hook.

When the foreign-substance-removing film 13 is peeled off, the foreign substances 200 on the substrate 100 are removed to expose a clean surface of the substrate 100. Immediately after the exposure of the surface of the substrate 100, the substrate-attaching adhesive layer 16 is brought into close contact with the surface to prevent entry of foreign substances in the interface between the attached surfaces. In order to continuously attach the optical film 17 while preventing entry of foreign substances in the interface between the attached surfaces, the foreign-substance-removing adhesive layer 12 is preferably peeled off by winding the foreign-substance-removing film 13 on a winding roller, and the substrate-attaching adhesive layer 16 is preferably brought into close contact with the substrate by being pressed with the attachment roller. In order to minimize entry of foreign substances in the interface between the attached surfaces, the peeling speed (film winding speed) for the foreign-substance-removing film 13 and the moving speed (film attachment speed) for the attachment roller are preferably made the same. From the viewpoint of continuously attaching the optical film 17, the peeling speed for the foreign-substance-removing film 13 may be equal to or higher than the moving speed for the attachment roller 41.

In the present embodiment, since the attachment is performed in the state that the optical film 17 is fixed by the tape 30, the optical film 17 can be precisely attached to the region from which the foreign substances 200 are removed. Furthermore, since the region from which the foreign substances 200 are removed is covered with the optical film 17 immediately after the foreign-substance-removing film 13 is peeled off, the foreign substances 200 such as dust in the surrounding air can also be prevented from sticking to the surface before attachment of the optical film 17.

In the present embodiment, it is important to keep the substrate-attaching adhesive layer 16 faced down to prevent sticking of the foreign substances 200 that fall from the above. Hence, when the substrate-attaching adhesive layer 16 is peeled off from the foreign-substance-removing film 13, the optical film 17 is preferably pulled in a direction that forms an angle from the substrate 100 of from 0° inclusive to 90° exclusive. Also, since it is easy to quickly peel off the foreign-substance-removing film 13 before attachment of the optical film 17, the time during which the substrate-attaching adhesive layer 16 is exposed can be shortened to sufficiently prevent the foreign substances 200 from sticking to the substrate-attaching adhesive layer 16.

(Procedure 5) Removal of Tape

When the tape 30 is removed, attachment of the optical film 17 to the substrate 100 is completed.

The attachment method described above enables attachment of the optical film 17 to the substrate 100 without entry of the foreign substances 200 and air bubbles in the interface between the attached surfaces even in a typical room environment. Also, since the method is a dry attachment method that does not employ a liquid differently from a conventional attachment method that utilizes soapy water, the work time can be greatly shortened, and contamination of the work environment can be prevented.

Embodiment 2

Figure 3:
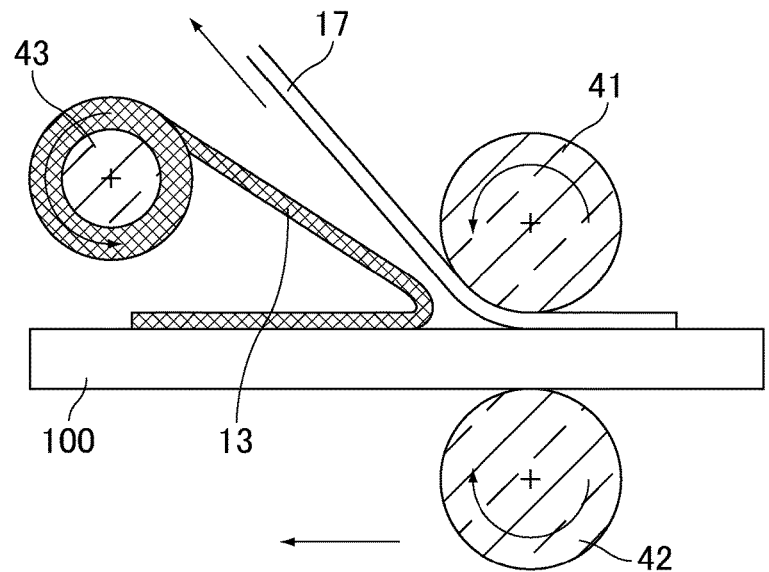
FIG. 3 is a schematic view illustrating one example of a mechanism for attaching the laminated film according to Embodiment 1.

In Embodiment 2, the mechanism of attachment of a laminated film and a jig used therefor are described. FIG. 3 is a schematic view illustrating one example of the mechanism for attaching the laminated film according to Embodiment 1. As illustrated in FIG. 3, the foreign-substance-removing film 13 is wound around a peel-off roller 43 by rotating the peel-off roller 43 such that the foreign-substance-removing film 13 is peeled off from the substrate 100. Simultaneously, attachment rollers 41 and 42 are rotated to move toward the foreign-substance-removing film 13 such that the optical film 17 is attached to the substrate 100. At this time, the rotational speed of the peel-off roller 43 is set to be equal to or faster than the rotational speeds of the attachment rollers 41 and 42. Also, the peel-off roller 43 is preferably positioned at the minimum height at which the peel-off roller 43 does not come into contact with the substrate 100 in order to prevent contact with the optical film 17. To the optical film 17, tensile force is applied by a mechanism that provides tensile force, such as a spring and a torque motor. The angle formed by the pulling direction of the optical film 17 and the substrate 100 is set to be larger than the angle formed by the peeling direction of the foreign-substance-removing film 13 and the substrate 100, but is kept small such that winding of the optical film 17 around the attachment roller 41 is prevented. Also, from the viewpoint of preventing entry of foreign substances under the optical film 17 before the attachment, the optical film 17 is preferably pulled at an angle smaller than the angle formed by the substrate 100 and the direction perpendicular to the substrate 100. Here, the substrate 100 may be supported by a plane surface of a table with a smooth surface or a surface plate, for example, without use of the attachment roller 42.

The foreign-substance-removing film 13 and the optical film 17 may each be provided with a lead portion for pulling. The lead portion extends from the body of the film 13 or 17, and is thinner than the body. Provision of lead portions allows easy application of uniform tensile force to the films 13 and 17 when they are pulled, which improves the workability, and increases the precision of attachment of the optical film 17. The lead portions may be portions integrally formed with the respective bodies of the films 13 and 17, or may be tape components (lead tape components) mounted on the bodies of the respective films 13 and 17.

Figure 4:
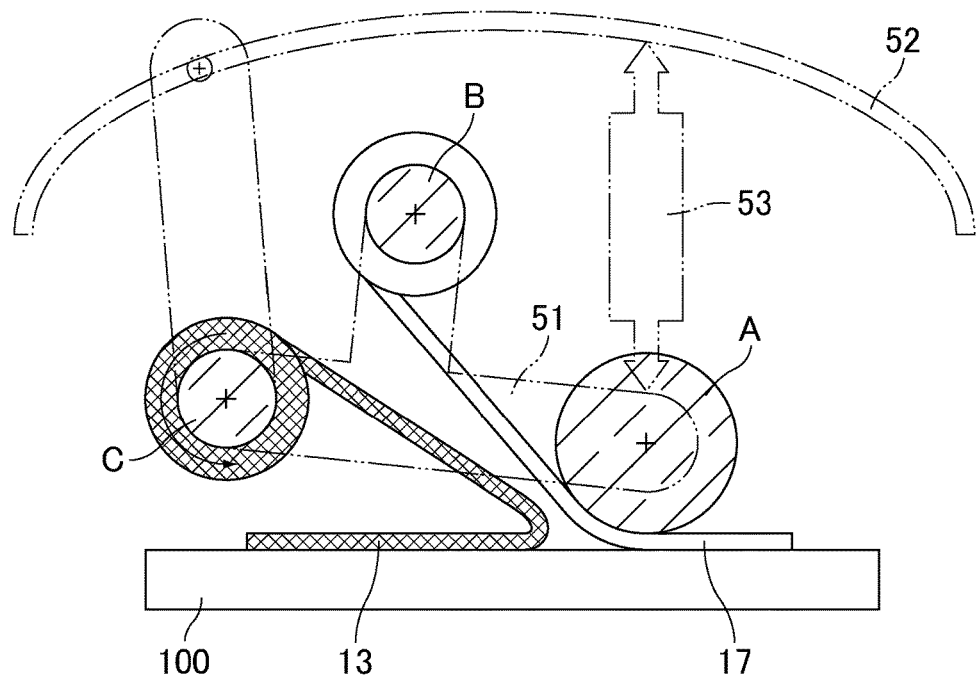
FIG. 4 is a schematic cross-sectional view illustrating one example of an attachment jig suitable for the attachment mechanism illustrated in FIG. 3.

FIG. 4 is a schematic cross-sectional view illustrating one example of an attachment jig suitable for the attachment mechanism illustrated in FIG. 3. The attachment mechanism illustrated in FIG. 3 includes peeling of the foreign-substance-removing film 13 by winding and simultaneous attachment of the optical film 17. This mechanism can be executed by one worker with use of the attachment jig illustrated in FIG. 4. The characteristic structure of the attachment jig illustrated in FIG. 4 is described below. In the attachment jig in FIG. 4, the roller A corresponds to the attachment roller 41 in FIG. 3, and the roller C corresponds to the peel-off roller 43.

(1) The rollers A, B, and C are all fixed to a side plate 51 at their rotational shafts. Therefore, the rollers A, B, and C can also be manually moved at the same speed above the substrate 100. Also, in order to rotate the rollers in the same direction at the same speed, the rollers A, B, and C are preferably connected to each other by, for example, a belt or chain. The roller A is of the same size as the roller C.

(2) The roller A is a freely rotating roller. The roller A is connected at its rotational shaft to a cover 52 by a spring 53, and is hanging from the cover 52. When the laminated film before attachment is brought under the roller A, the cover 52 is lifted, and the roller A is arranged above the substrate 100 with a space in between. Also, for attachment of the optical film 17, the roller A is pressed onto the optical film 17 by manually pushing the cover 52 from the above or the like technique.

(3) The roller B is a brake roller, and can send out the wound film under a certain tensile force. Around the roller B, an auxiliary tape having the maximum length for attachment is wound, and then an end of the auxiliary tape is connected to an end (lead portion) of the optical film 17. During the work to connect the auxiliary tape to the optical film 17, the auxiliary tape is spread out for ease of work, and then tensile force is applied. For this reason, the roller B has a mechanism that controls the rotation of the roller in one direction, such as a cam structure. With this mechanism, rotating the roller B applies the initial tensile force. Here, the initial tensile force is preferably applied after an end of the optical film 17 is brought into contact with the substrate 100.

(4) The roller C is a brake roller that is connected to the roller A as described above, and has a brake mechanism at the shaft of the roller to apply a certain tensile force to the torque. Similarly to the roller B, the roller C is mounted on the foreign-substance-removing film 13, and applies a tensile force to the film. The auxiliary tape wound around the roller C is attached to the portion of the foreign-substance-removing film 13 to be pulled (the right side in FIG. 4). The roller C also has a mechanism that controls the rotation of the roller to one direction.

(5) After the optical film 17 and the roller B are connected and the foreign-substance-removing film 13 and the roller C are connected, the lower surface of the end of the optical film 17 at which the substrate-attaching adhesive layer 16 is exposed is placed on the substrate 100. The optical film 17 is pressed from the above by the roller A so that these components come into close contact with each other. While the optical film 17 is pressed, the roller C, and then the roller B are manually rotated in the direction in which tensile force is applied, so that tensile force is applied to the optical film 17 and then to the foreign-substance-removing film 13. When tensile force is applied to both of the films 13 and 17, the cover 52 is pressed by hand to prevent rotation of the roller A and maintain the pressure from the roller A, and at the same time, the attachment jig is slowly moved in the leftward direction in FIG. 4, so that the optical film 17 is attached.

(6) The cover 52 is transparent or partially transparent. The cover 52 and the side plate 51 are connected by a pin, and thereby the cover 52 is rotatably fixed to the side plate 51. The cover 52 is removable from the body of the attachment jig. That is, the cover 52 can be easily disconnected from the side plate 51 and the rollers A, B, and C, and can also be combined with these components. Therefore, the work may be performed in the state where the cover 52 is removed from the attachment jig, if necessary. Also, a hole may be made in the cover 52 to introduce therethrough gas that is free from foreign substances, such as nitrogen gas. When the attachment is performed while gas is introduced through the hole of the cover 52, entry of foreign substances in the interface between the attached surfaces can be prevented more effectively.

Figure 5:
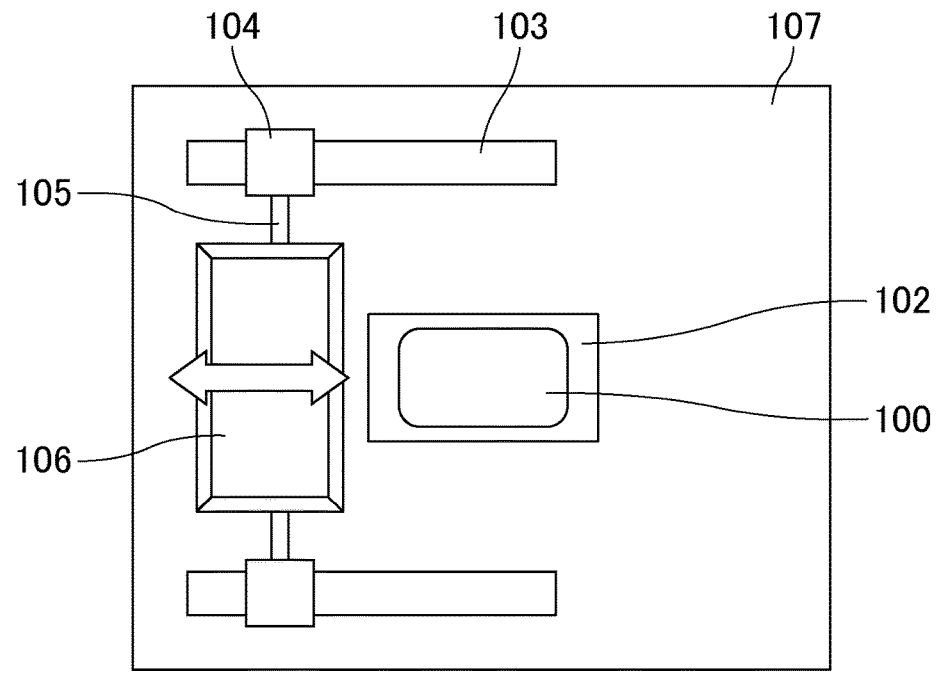
FIG. 5 is a schematic plan view illustrating one example of an attachment device including the attachment jig illustrated in FIG. 4.

FIG. 5 is a schematic plan view illustrating one example of an attachment device including the attachment jig in FIG. 4. In the attachment device illustrated in FIG. 5, the substrate 100 is fixed, and the attachment jig 106 in FIG. 4 is moved along guide rails 103. Thereby, the optical film 17 can be attached with high precision. This device is suitable in the case where the substrate 100 which is the attachment target of the optical film 17 is as small as a product such as a mobile device.

The structure of the attachment device illustrated in FIG. 5 and the use method thereof are described below. The substrate 100 is fixed on a fixation base 102 on a table 107. The attachment jig 106 is connected to sliders 104 each of which moves on the guide rail 103, via a connection jig 105 so as to be movable along the guide rails 103. The ends of the fixation base 102 and the guide rails 103 are in parallel with each other. The connection jigs 105 are orthogonal to the guide rails 103. When the sliders 104 move on the guide rails 103, the connection jigs 105 and the attachment jig 106 can move linearly in the direction parallel to the guide rails 103. The number of the guide rails 103 may be one, or may be two which are on the opposite sides of the fixation base 102 as illustrated in FIG. 5.

Figure 6:
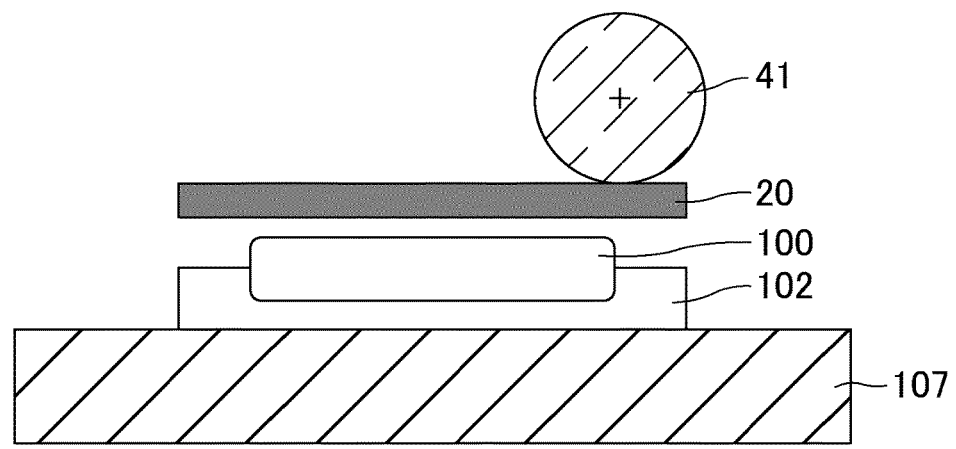
FIG. 6 is a schematic cross-sectional view for describing the method for attaching an optical film by the attachment device illustrated in FIG. 5.

FIG. 6 is a schematic cross-sectional view for describing the method for attaching an optical film by the attachment device illustrated in FIG. 5. As illustrated in FIG. 6, the attachment of the optical film 17 can be performed by fixing the substrate 100 on the fixation base 102, placing the laminated film 20 thereon, and pressing the laminated film 20 onto the substrate 100 by the attachment roller 41 which is a part of the attachment jig 106.

Embodiment 3

Figure 7:
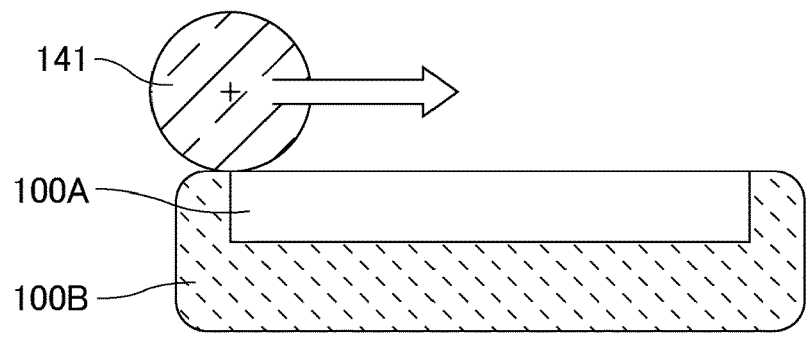
FIG. 7 is an explanatory view illustrating attachment of a laminated film to a substrate having an even surface.
Figure 8:
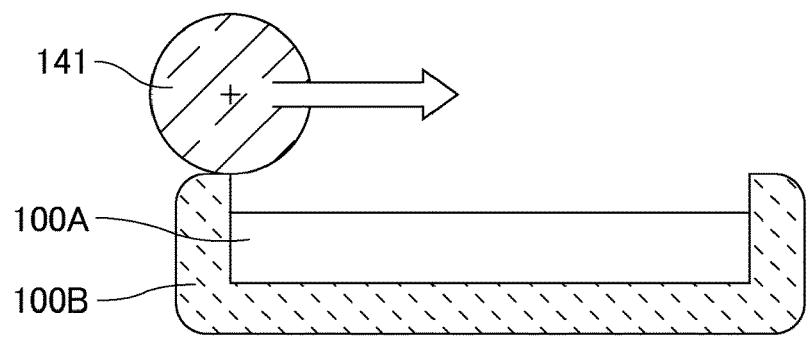
FIG. 8 is an explanatory view illustrating attachment of a laminated film to a substrate having an uneven surface.

Embodiment 3 describes the case where the functional film is attached to a substrate with an uneven portion on the surface. Examples of the substrate with an uneven portion on the surface include display devices including a frame portion (outer frame) around the display portion. Such a display device has an uneven portion as a border between the display portion and the frame portion, and each of the four sides of the rectangular display portion may form an uneven portion. In particular, middle- to large-sized display devices such as laptop screens, monitors, and TVs often have uneven portions. As illustrated in FIG. 7, in the case of a substrate which includes no uneven portions formed by the upper surface of a display portion (which may be a front plate) 100A and the upper surface of a frame portion 100B and includes no irregularities on the surface, it is easy to attach the laminated film according to Embodiment 1 to the surface by pressing the film with the attachment roller 141. However, as illustrated in FIG. 8, in the case of a substrate which has protrusions on the outer periphery, if the laminated film to be pressed has the same structure as the laminated film according to Embodiment 1, the heights of the protrusions on the outer periphery are higher than the thickness of the laminated film to be pressed. Since the width of the attachment roller 141 is generally greater than the width of the substrate to be pressed, such protrusions on the outer periphery may come into contact with the attachment roller 141 to hinder the attachment roller 141 from pressing the surface of the workpiece, leading to a failure of the attachment. FIG. 7 is an explanatory view illustrating attachment of a laminated film to a substrate having an even surface. FIG. 8 is an explanatory view illustrating attachment of a laminated film to a substrate having an uneven surface.

Figure 9:
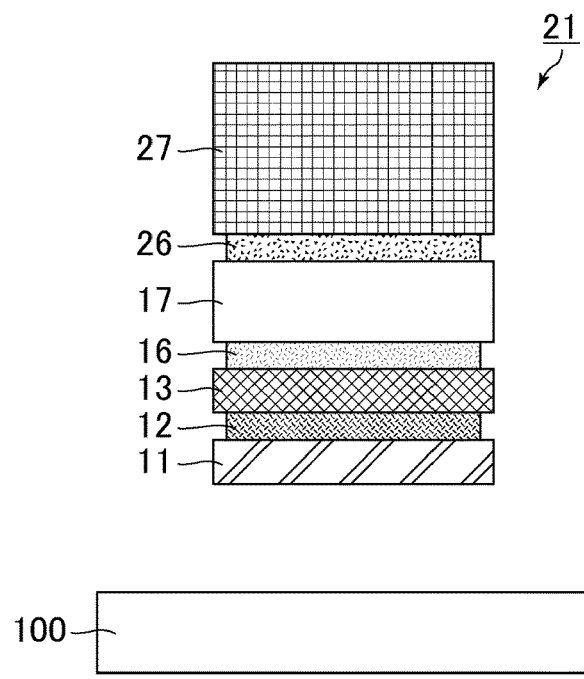
FIG. 9 is a schematic cross-sectional view illustrating one example of a laminated film including a cushion layer according to Embodiment 3.
Figure 10:
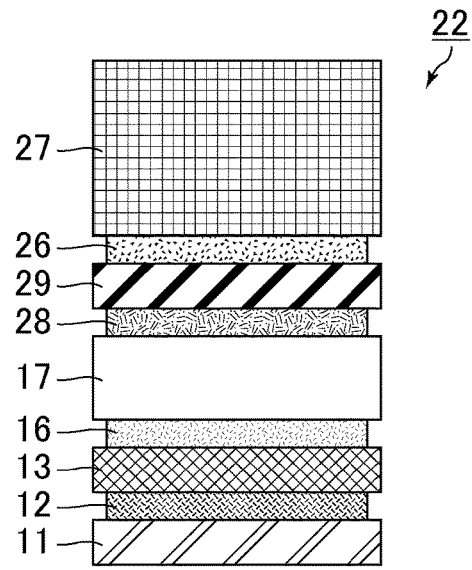
FIG. 10 is a schematic cross-sectional view illustrating another example of the laminated film including a cushion layer according to Embodiment 3.
Figure 10:

In order to attach the functional film to a substrate with irregularities on the surface, the laminated film according to Embodiment 3 includes a cushion layer (buffer layer) formed from an elastic body on the side of the optical film (functional film) 17 according to Embodiment 1 opposite to the side where the optical film 17 is in contact with the substrate-attaching adhesive layer 16. FIG. 9 is a schematic cross-sectional view illustrating one example of a laminated film including a cushion layer according to Embodiment 3. FIG. 10 is a schematic cross-sectional view illustrating another example of a laminated film including a cushion layer according to Embodiment 3. A laminated film 21 in FIG. 9 has a structure in which the cushion layer 27 is directly laminated on one surface of the optical film 17 with an adhesive layer 26 in between. A laminated film 22 in FIG. 10 has a structure in which a separator film 29 is laminated on one surface of the optical film 17 with an adhesive layer 28 in between. On the side of the separator film 29 opposite to the adhesive layer 28, the cushion layer 27 is laminated with the adhesive layer 26 in between.

Those suited for the cushion layer 27 are flexible and have a hardness with which the cushion layer 27 can maintain its film shape when peeled off. Suitable examples of the material of the cushion layer 27 include foamed bodies of resin materials. Suitable examples of the resin materials include urethane resins and butadiene resins. The cushion layer 27 can be, for example, urethane foam (trade name: Nippalay, 5-mm thick) from NHK Spring Co., Ltd.

Figure 11:
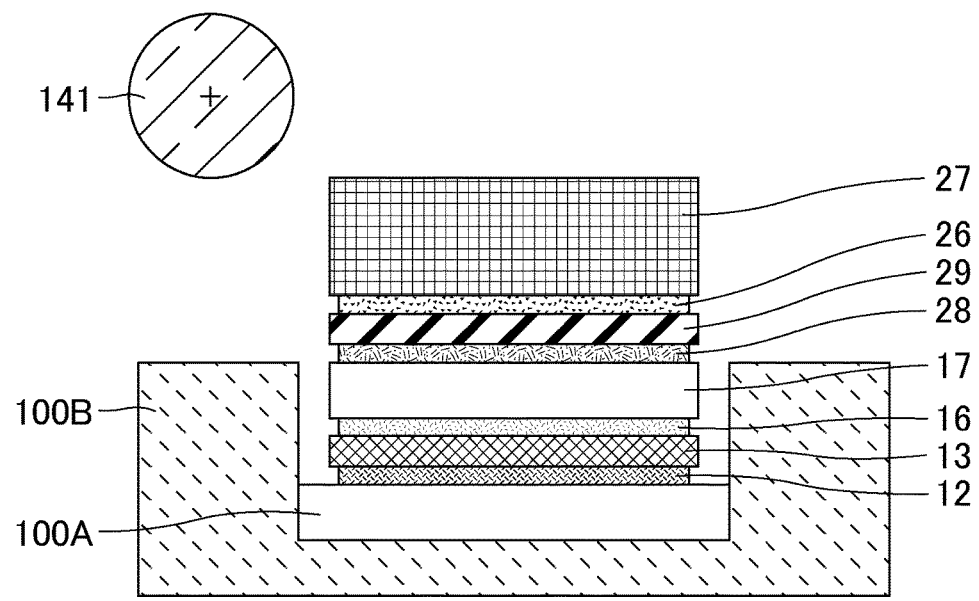
FIG. 11 is an explanatory view illustrating a laminated film attached to a substrate by a foreign-substance-removing adhesive layer.
Figure 12:
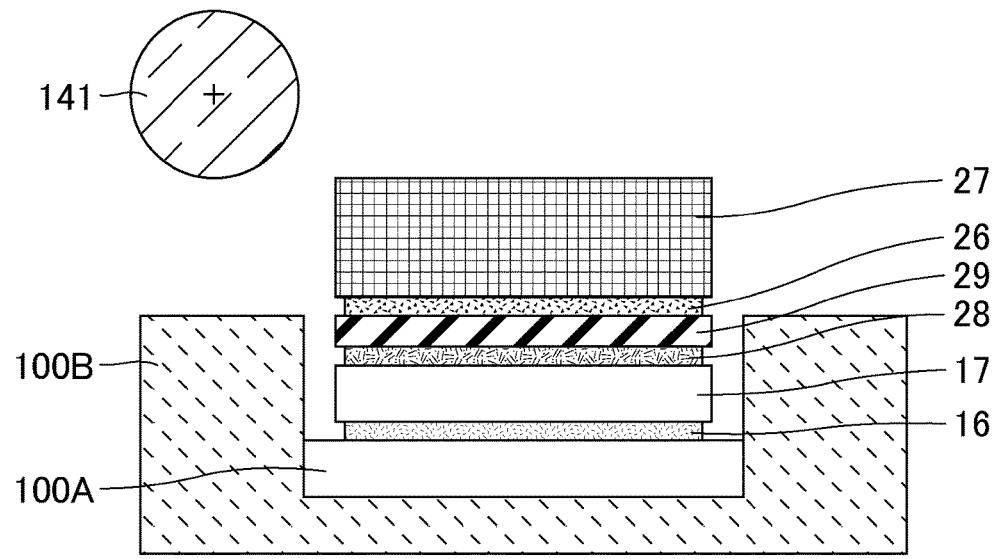
FIG. 12 is an explanatory view illustrating an optical film attached to a substrate.

The thickness of the cushion layer 27 is set to be appropriate for the size of the uneven portion on the substrate surface, and the cushion layer 27 preferably protrudes out from the upper end of the frame portion 100B (upper end of the uneven portion on the substrate surface) when the optical film 17 is attached to the substrate 100. That is, it is preferred that the total thickness of the optical film 17, the adhesive layer 28, and the cushion layer 27 (in the case of FIG. 9) or the total thickness of the optical film 17, the adhesive layer 28, the separator film 29, the adhesive layer 26, and the cushion layer 27 (in the case of FIG. 10) is larger than the thickness of the frame portion 100B, not in the state where the laminated film is attached to the substrate 100 by the foreign-substrate removing adhesive layer 12 as illustrated in FIG. 11, but in the state where this foreign-substance-removing adhesive layer 12 is peeled off from the surface of the substrate 100 and the substrate-attaching adhesive layer 16 is brought into close contact with the substrate 100 so that the optical film 17 is attached to the substrate 100 as illustrated in FIG. 12. FIG. 11 is an explanatory view illustrating a laminated film attached to a substrate by a foreign-substance-removing adhesive layer. FIG. 12 is an explanatory view illustrating an optical film attached to a substrate. Also, the cushion layer 27 is preferably designed such that 50% or more of the cushion layer 27 protrudes from the upper end of the frame portion 100B when the optical film 17 is attached to the substrate 100. The cushion layer 27 is usually designed to be the thickest among the substrate-attaching adhesive layer 16, the optical film 17, the adhesive layer 26, the adhesive layer 28, and the separator film 29, and is designed to be, for example, about 0.5 mm to 10 mm. The material of each of the adhesive layers 26 and 28 is preferably an adhesive material suited for an optical material.

The optical film 17 and the layers thereunder in the case of the structure in FIG. 9, and the separator film 29 and the layers thereunder in the case of the structure in FIG. 10, are cut to suit the size of the attachment portion of the substrate 100, and are attached to the cushion layer 27 cut to be slightly smaller than the above layers, with a space left at the edge for the case of misalignment. Although the resulting roll as a product is large, the layers may be produced by the roll-to-roll process, and then the cushion layer 27 may be cut at the same time.

With a display (from Sharp Corporation: monitor display LL-171G-W), an attachment experiment was performed. The films such as the optical film 17 were cut at sites 3 mm inside the periphery. The uneven portion formed by the frame portion 100B and the display was about 2 mm. When attached, the laminated film protruded out from the outer frame by about +3.5 mm. When pressure is applied by the attachment roller, the pressure was transferred to the optical film 17 via the cushion layer 27. As a result, the attachment was performed without entry of foreign substances, and without attachment unevenness or generation of air bubbles due to insufficient attachment pressure.

Embodiment 4

In Embodiment 4, the structure of a display device including an uneven portion formed by the presence of the frame portion (outer frame) is described based on an exemplary liquid crystal display device.

Figure 13:
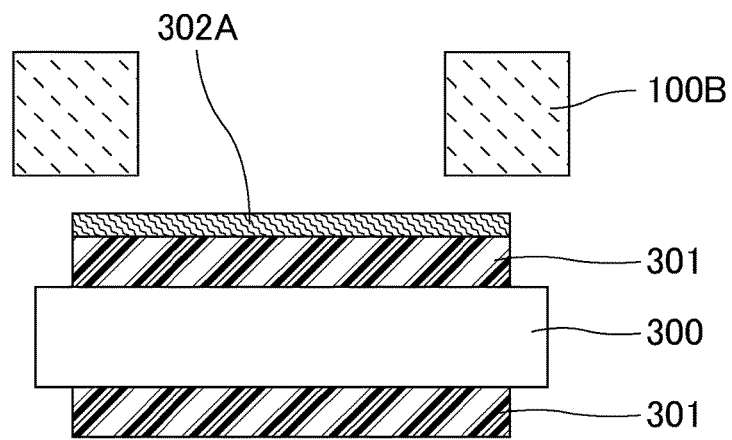
FIG. 13 is a schematic cross-sectional view illustrating the general structure of a conventional liquid crystal display device.

FIG. 13 is a schematic cross-sectional view illustrating the general structure of a conventional liquid crystal display device. As illustrated in FIG. 13, the conventional liquid crystal display device has an uneven portion as a border between the display surface of the liquid crystal panel 300 and the frame portion 100B. An optical film 302A laminated in the image display region of the liquid crystal panel 300 on the obverse side via a polarizer 301 is designed to be larger than the opening of the frame portion 100B which is open to correspond to the image display region of the liquid crystal panel 300, so that the end surface of the optical film 302A is not in the opening of the frame portion 100B. With such a structure, the frame portion 100B needs to be removed when the optical film 302A is changed, which may have required breaking of the frame portion 100B.

Figure 14:
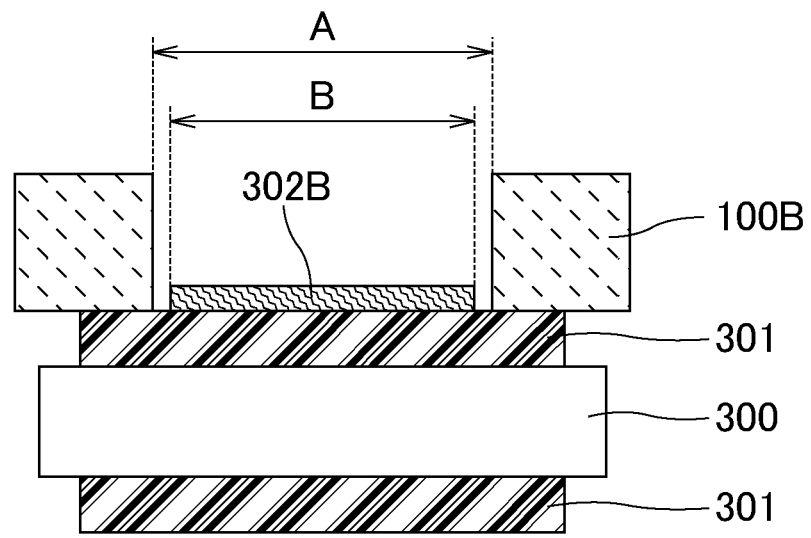
FIG. 14 is a schematic cross-sectional view illustrating the structure of a liquid crystal display device in Embodiment 4.

FIG. 14 is a schematic cross-sectional view illustrating the structure of a liquid crystal display device of Embodiment 4. In the structure of FIG. 14, there is an uneven portion having a height of 0.1 to 20 mm, for example, between the top of the protrusion of the frame portion 100B and the surface of the liquid crystal panel 300. When the width of the opening of the frame portion 100B is defined as A and the width of the optical film 302B arranged within the opening is defined as B, an optical film 302B is arranged on the outermost surface of the liquid crystal panel 300 to satisfy the relation of A−B>0. With such a structure, the optical film 302B can be changed to a new one without removing the outer frame 100B. As a result, the optical film 302B attached to the surface of the liquid crystal panel 300 can be easily changed when damaged, or the optical film 302B attached to the surface of the liquid crystal panel 300 can be easily changed to the most advanced optical film as needed. For example, change of films can be facilitated for optical films such as low reflection films (e.g. films with a moth-eye structure), anti-glare (AG) films, polarizers, circular polarizers, anti-fouling films, hard coat (HC) films, and SAM films. Although a liquid crystal display device is described as an example of the display device of Embodiment 4, the display device may be a flat display panel (FDP) such as an organic light-emitting diode (OLED) and a display device with a micro electro-mechanical system (MEMS) shutter system, or may be a display device with a touch panel.

The preferred shape of the optical film 302B in a plan view is generally a rectangle which is almost the same as the shape of the display area, and may include a tab for manually removing the film for change. The tab can be formed by providing a protrusion to a part of a long side or a short side of a portion (display portion) corresponding to the display area of the optical film 302B. The shape of the protrusion can be a rectangle, a square, a semicircle, a trapezoid, or a shape formed by rounding the corners of any of these shapes. Furthermore, on the border between the display portion of the optical film 302B and the tab, a dent line (cut line) may be provided. The dent line may be a straight line or an intermittent dotted line.

Fifth Embodiment

In Embodiment 5, the film attachment method in the case where the attachment surface of the substrate is a curved surface is described. For film attachment, a weak adhesive layer made of a silicon-based weak adhesive material is commonly used. Although such a silicon-based weak adhesive layer has weak adhesive power, the film is brought into close contact when the air is pushed out from the interface. The silicon-based weak adhesive layer is thus suitable for attachment to a flat glass plate, but in the case of a curved attachment surface, the film tends to peel off at an end due to its elastic modulus. Also in the case where the film is attached to the surface of a polymer (resin material) or the surface of a film with irregularities (e.g. AG film), the film tends to peel off. In the case of a resin material, especially on a hydrophobic surface with many weak C—H bonds, the contact power of the adhesive material decreases. Since weak adhesive materials are designed to have a low contact power, a slight decrease in the contact power leads to peeling. On the irregular surface, a weak adhesive material having a small deformation amount cannot fit the irregularities, which is likely to allow entry of air bubbles, causing peeling from the peripheries where stress is easily applied.

Such peeling can be suppressed by use of a strong adhesive layer. A strong adhesive layer, however, involves difficulties in reattachment, and therefore foreign substances entered during attachment cannot be removed. With the laminated film of the present invention, a strong adhesive layer can be used to attach a functional film while entry of foreign substances is prevented. The laminated film of the present invention thus enables attachment to a curved surface.

Figure 15:
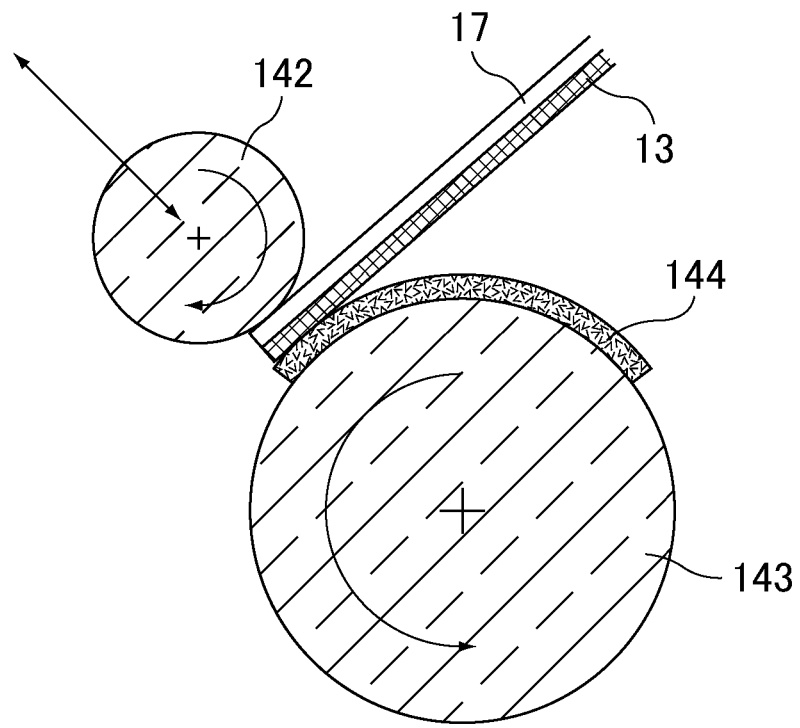
FIG. 15 is a schematic side view for describing the structure of an attachment jig for a curved substrate.

The process of attaching the laminated film of the present invention to a curved surface is basically the same as that in Embodiment 1, but the attachment jig illustrated in FIG. 15 is suitably used. FIG. 15 is a schematic side view for describing the structure of an attachment jig for a curved substrate. As illustrated in FIG. 15, the attachment jig has a structure in which a curved-surface attachment roller 142 and a cylindrical supporting drum 143 face each other. The curved-surface attachment roller 142 is connected to an elastic body such as a spring or to a piston, and is driven in the up-down directions (the directions of the arrow in FIG. 15) under a certain pressure. On the supporting drum 143, a curved substrate 144 such as a curved display to which a film is to be attached is arranged. The supporting drum 143 is selected to suit the curvature of the curved substrate 144. Here, the curved-surface attachment roller 142 can be separated from the drive system to be free in the rotational direction or an adjustment jig may be used, so that the difference in the curvatures of the drum and the substrate can be eliminated. The film is attached by passing the laminated film including the foreign-substance-removing film 13 and the optical film 17 between the curved-surface attachment roller 142 and the supporting drum 143 in the state where the curved substrate 144 is arranged on the supporting drum 143.

Here, in the case of using an attachment jig illustrated in FIG. 15, the curvature of each of the supporting drum 143 and the curved substrate 144 is preferably 30 mmϕ or more. A curvature of less than 30 mmϕ may cause the attached film to be peeled off. For example, when a strong adhesive (LINTEC Corporation, MO3014) was attached to a triacetyl cellulose (TAC) layer with a curvature of less than 30 mmϕ and a thickness of 80 μm, storage of the resulting product at 40° C. for 24 hours resulted in peeling of an end of the optical film 17.

Example 1

Figure 16:
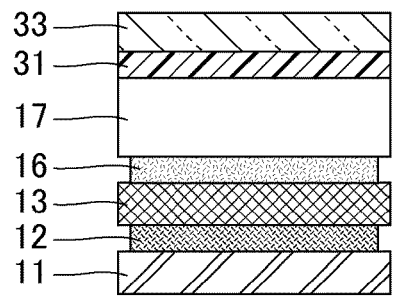
FIG. 16 is a schematic cross-sectional view illustrating a laminated film according to Example 1.
Figure 17:
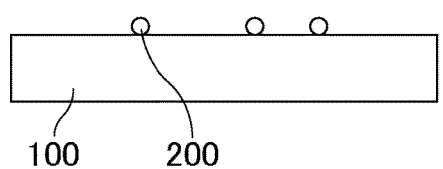
FIG. 17 is a schematic cross-sectional view illustrating a conventional method for attaching a laminated film.
Figure 17:
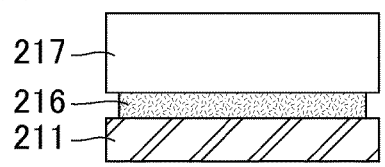
Figure 17:
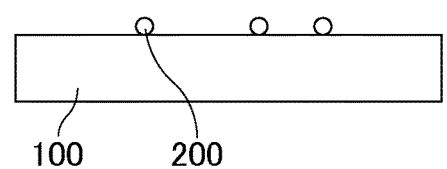
Figure 17:
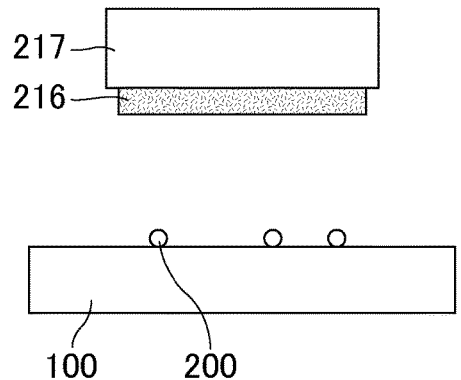
Figure 17:
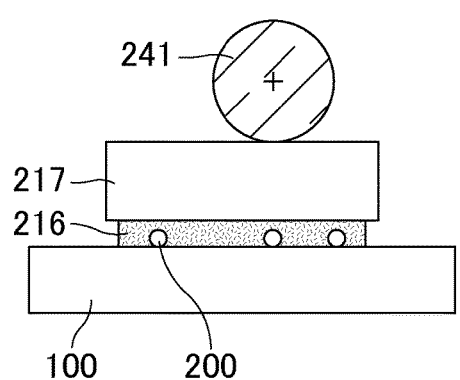

Example 1 shows the case where a laminated film according to Embodiment 1 was actually produced. FIG. 16 is a schematic cross-sectional view illustrating the laminated film of Example 1. The laminated film of Example 1 has the structure illustrated in FIG. 16, and the materials and the thicknesses of the respective layers are as listed below.

Separator film 11: PET film, 38 μm in thickness
Foreign-substance-removing adhesive layer 12: Fujimori Kogyo Co., Ltd., (trade name) ZBO-0421, 21 μm in thickness
Foreign-substance-removing film 13: PET film, 38 μm in thickness
Substrate-attaching adhesive layer 16: LINTEC Corp., (trade name) MO3014, 50 μm in thickness
Optical film 17: moth-eye film, 70 μm in thickness
Adhesive layer 31: moth-eye film adhesive agent (LINTEC Corp.), 25 μm in thickness
Protective film 33: PET film, 100 μm in thickness The first separator film 11, the foreign-substance-removing film 13, and the protective film 33 were each a PET film. A PET film has an excellent mechanical strength and is industrially mass-produced even though it is inferior to a PEN film and a COP film in terms of the optical properties. Hence, a PET film is particularly suited for a film which is not required to have high optical properties.

(Characteristics of PET Film)
Tensile strength: 200 to 290 MPs
Transmittance: 89%
Haze: 2 to 3%
(Characteristics of PEN Film)
Tensile strength: 200 to 290 MPs
Transmittance: 89%
Haze: 2 to 3%
(Characteristics of COP Film)
Tensile strength: 60 to 80 MPs
Transmittance: 92%
Haze: 0.1% or lower A moth-eye film is a laminated body including an upper layer made of an acrylate-based photocurable resin and a lower layer made of triacetyl cellulose (TAC). On the surface of the upper layer, 200 nm height protrusions are formed with an interval of 200 nm to form a moth-eye surface structure. The material of the optical element film is selected to suit the use, and a TAC film having a high transmittance (92%) is suitable. In order to increase the moisture resistance and heat resistance, a film such as a COP film may also be used.

The adhesive power of each layer in the laminated film of Example 1 was as described below. The adhesive power was measured by the following method using a substrate made of alkali-free glass as an attachment target. Here, an easy-peel treatment was performed on the substrate-attaching adhesive layer 16 side surface of the foreign-substance-removing film 13, and thus the adhesive power of the substrate-attaching adhesive layer 16 was measured using an alkali-free glass substrate on which the same easy-peel treatment was performed. In the following, the unit of the adhesive power is N/25 mm width. The measurement was performed on multiple samples, and thus the adhesive power is shown as a value in a range.

Foreign-substance-removing adhesive layer 12 (interface with separator film 11): 0.3 to 0.4

Substrate-attaching adhesive layer 16 (interface with foreign-substance-removing film 13): 1 to 2

Adhesive layer 31 (interface with optical film 17): 0.1 to 0.2

(Method for Measuring Adhesive Power)

On the substrate horizontally fixed, a strip-like film including an adhesive layer with a width of 25 mm was attached. At this time, one end of the film was not attached to the substrate. The one end not attached to the substrate was held between clamps of a tensile tester (peel test jig), so that a 90° peel test (rate of pulling: 0.3 m/min) was performed.

The laminated film of Example 1 is peeled off from the lowest film. Hence, the adhesive power values of the films preferably satisfy the relation of the foreign-substance-removing adhesive layer 12<the substrate-attaching adhesive layer 16, in consideration of the process. Also, since the workability decreases when the adhesive power of the foreign-substance-removing adhesive layer 12 is excessively high, the foreign-substance-removing adhesive layer 12 is preferably an easy-peel adhesive layer formed from a resin which has low adhesive power and of which the reaction has been fully completed.

Also, on the upper surface of the foreign-substance-removing film 13, an easy-peel treatment has been performed. The substrate-attaching adhesive layer 16 had a higher bond strength with the optical film 17 than with the foreign-substance-removing film 13.

In the above embodiments and example, optical films were used as the functional films, but in the present invention, the kind of the functional film is not particularly limited. Examples of the functional film include optical films and protective films each designed to be attached to the surface of a display device such as a mobile device, and protective films and decorative films used for applications such as building materials and display cases.

Suitable examples of the optical film in the present invention include the following films (1) to (7), and combinations of at least two of the following films (1) to (7). The concept of the present invention is preferably applied to a functional film that is expensive and exhibits poor yield.

(1) Anti-Reflection Film

Examples of the anti-reflection film include films having a moth-eye structure, and films formed by laminating low-refractive thin-films. A film having a moth-eye structure include protrusions arranged at a pitch and a height of 100 nm to hundreds of nm, and exhibits a function of preventing interface reflection by continuously changing the refractive index in the interface with the air layer.

(2) Circular Polarizer

A circular polarizer arranged on the surface of a liquid crystal panel can prevent light, which entered the liquid crystal panel from the outside and then reflected in the inside of the liquid crystal panel, from being emitted to the outside. That is, reflection of the external light on the display screen can be prevented. This is because the polarization state of the polarized light reflected inside the liquid crystal panel is 90° circulated by a change in the phase difference of $\lambda/2$, and is blocked by the circular polarizer. A combination of the circular polarizer with the anti-reflection film (1) can suppress both the surface reflection and the internal reflection, and is effective in improving the display qualities.

(3) Film Improving Antifouling Property and Abrasion-Resistance

Examples of the film include those on which a water/oil repellent film is formed. Examples of the water/oil repellent film include films obtained by applying a solubilized fluoropolymer and drying the fluoropolymer; films of a siloxane-based material obtained by chemically bonding molecules with fluorine-based side chains to the surface of a substrate by reactive groups; and films having a low surface tension obtained by polymerizing fluorine-based monomers and oligomers. Examples of the commercially available products thereof include CYTOP (from Asahi Glass Co., Ltd.) which is a soluble fluoropolymer, and Fluoro Surf (from Fluoro-Technology Co., LTD.) which is a fluoro compound mold release agent.

(4) SAM Film

This is a wide-viewing-angle film that diffuses straight-advancing light to all directions by the fine wedge-shaped slope structure.

(5) Film Touch Panel

The processing yield of the film can be improved by attaching the film in the rolled state, and cutting the film after application of an adhesive agent. This is because an increase in the thickness of the film at the time of attachment leads to an appropriate strength. In particular, when the film is attached to a large-sized display device such as one for signage, the effect of improving the yield is large.

(6) Film for which Clean Room Cannot be Used

Optical films for building materials (e.g. shatterproof films, heat-ray cutting films, anti-fouling films, anti-glare (AG) films, damage resistant films, anti-fogging films) are usually washed with water and attached with water, but entry of foreign substances is not avoidable, and use of water requires additional work for covering at site. The film structure and the film attachment method of the present invention eliminate use of water, and can sufficiently prevent entry of foreign substances even outside a clean room.

(7) Glass Thin Plate (Especially Front Plate)

The processing yield of the film can be improved by attaching the film in the rolled state, and cutting the film after application of an adhesive agent. This is because an increase in the thickness of the film at the time of attachment leads to an appropriate strength, which reduces the risk of breaking.

[Remarks]

Hereinafter, preferred examples of the laminated film of the present invention are described. These examples may be appropriately combined as long as the combination does not go beyond the spirit of the present invention.

Preferably, in the interface with the substrate-attaching adhesive layer, the foreign-substance-removing film is surface-treated for a decrease in the bond strength with the substrate-attaching adhesive layer. Examples of the surface treatment include coating.

The foreign-substance-removing film is preferably colored.

The functional film is preferably an optical film. Examples of the optical film include films having a moth-eye structure.

The functional film is preferably a protective film. The functional film may function both as an optical film and a protective film.

The laminated film may further include a buffer layer on the side of the functional film opposite to the side where the functional film is in contact with the substrate-attaching adhesive layer.

Hereinafter, preferred examples of the film attachment method of the present invention are described. These examples may be appropriately combined as long as the combination does not go beyond the spirit of the present invention.

In the step (4), preferably, the substrate-attaching adhesive layer is peeled off from the foreign-substance-removing film by pulling the functional film in a direction that forms an angle from the substrate of from 0° inclusive to 90° exclusive. The smaller the V-shaped space formed by lifting of the functional film is, the more the possibility of entry of foreign substances can be reduced.

In the step (5), preferably, the foreign-substance-removing adhesive layer is peeled off by winding the foreign-substance-removing film on a winding roller, and the substrate-attaching adhesive layer is brought into close contact with the substrate by pressing the substrate-attaching adhesive layer onto the substrate with an attachment roller.

Preferably, a winding speed for the foreign-substance-removing film is equal to or faster than an attachment speed for the functional film.

In the step (5), preferably, a pick-up stick including an adhesive member at an end is used. Also preferably, a pick-up stick including a hook at an end is used.

In one embodiment, the substrate has a curved surface, and in the step (2), the laminated film may be attached to the substrate by arranging the substrate on a supporting drum having a cylindrical shape, and passing the laminated film between the supporting drum and an attachment roller arranged to face the supporting drum.

Another aspect of the present invention may be a display device including: a display panel provided with an image display region; an optical film arranged on the outermost surface of the display panel; and an outer frame including a portion protruding more than the outermost surface of the display panel, the optical film covering the image display region, the outer frame including an opening that exposes the entire region in which the optical film is arranged.

REFERENCE SIGNS LIST

11: Separator film
12: Foreign-substance-removing adhesive layer
13: Foreign-substance-removing film
16: Substrate-attaching adhesive layer
17: Optical film
20, 21, 22: Laminated film
26, 28: Adhesive layer
27: Cushion layer (buffer layer)
29: Separator film
30: Tape
31: Adhesive layer
33: Protective film
41, 42, 141, 241: Attachment roller
43: Peel-off roller
51: Side plate
52: Cover
53: Spring
100: Substrate
100A: Display portion
100B: Frame portion (outer frame)
102: Fixation base
103: Guide rail
104: Slider
105: Connection jig
106: Attachment jig
107: Table
142: Curved-surface attachment roller
143: Supporting drum
144: Curved substrate
200: Foreign matter
211: Separator film
216: Adhesive layer
217: Optical film
A, B, C: Roller
300: Liquid crystal panel
301: Polarizer
302A, 302B: Optical film

The invention claimed is:
1. A laminated film comprising in the following order:
a separator film;
a foreign-substance-removing adhesive layer;
a foreign-substance-removing film;
a substrate-attaching adhesive layer; and
a functional film,
wherein the substrate-attaching adhesive layer includes a relatively higher adhesive power than the foreign-substance-removing adhesive layer,
wherein an adhesive power of the foreign-substance removing adhesive layer is 0.05 to 1 N/25 mm width,
wherein an adhesive power of the substrate-attaching adhesive layer is 1 to 30 N/25 min width, and
wherein the substrate-attaching adhesive layer exhibits a relatively higher bond strength with the functional film than with the foreign-substance-removing film.
2. The laminated film according to claim 1,
wherein, in an interface with the substrate-attaching adhesive layer, the foreign-substance-removing film is surface-treated for a decrease in bond strength with the substrate-attaching adhesive layer.
3. The laminated film according to claim 1,
wherein the foreign-substance-removing film is colored.
4. The laminated film according to claim 1,
wherein the functional film is an optical film.
5. The laminated film according to claim 1,
wherein the functional film is a protective film.
6. The laminated film according to claim 1, further comprising
a buffer layer on a side of the functional film opposite to a side where the functional film is in contact with the substrate-attaching adhesive layer.
7. A film attachment method for attaching to a substrate a functional film included in the laminated film according to claim 1, comprising the steps of:
(1) peeling off the separator film from the laminated film to expose the foreign-substance-removing adhesive layer;

(2) bringing the exposed foreign-substance-removing adhesive layer into close contact with the surface of the substrate to attach the laminated film to the substrate;

(3) connecting, by a connection component, a vicinity of the region of the substrate with the laminated film attached thereto and an end of the functional film that is on the top of the laminated film;

(4) peeling off the substrate-attaching adhesive layer from the foreign-substance-removing film in the state where the substrate and the functional film are kept in contact with each other by the connection component; and (5) while peeling off the foreign-substance-removing adhesive layer from the surface of the substrate to expose the surface of the substrate, bringing the substrate-attaching adhesive layer into close contact with the exposed surface of the substrate to attach the functional film to the substrate.

8. The film attachment method according to claim 7, wherein in the step (4), the substrate-attaching adhesive layer is peeled off from the foreign-substance-removing film by pulling the functional film in a direction that forms an angle from the substrate of from 0° inclusive to 90° exclusive.

9. The film attachment method according to claim 7, wherein in the step (5), the foreign-substance-removing adhesive layer is peeled off by winding the foreign-substance-removing film on a winding roller, and the substrate-attaching adhesive layer is brought into close contact with the substrate by pressing the substrate-attaching adhesive layer onto the substrate with an attachment roller.

10. The film attachment method according to claim 9, wherein a winding speed for the foreign-substance-removing film is equal to or faster than an attachment speed for the functional film.

11. The film attachment method according to claim 7, wherein in the step (5), a pick-up stick including an adhesive member at an end is used.

12. The film attachment method according to claim 7, wherein in the step (5), a pick-up stick including a hook at an end is used.

13. The film attachment method according to claim 7, wherein the substrate has a curved surface, and in the step (2), the laminated film is attached to the substrate by arranging the substrate on a supporting drum having a cylindrical shape, and passing the laminated film between the supporting drum and an attachment roller arranged to face the supporting drum.

* * * * *